(12) United States Patent
Cox

(10) Patent No.: US 11,486,494 B2
(45) Date of Patent: Nov. 1, 2022

(54) ELASTOMERIC SEAL FOR AN ENCLOSURE

(71) Applicant: Dana Automotive Systems Group, LLC, Maumee, OH (US)

(72) Inventor: Samuel W. Cox, Paris, TN (US)

(73) Assignee: Dana Automotive Systems Group, LLC, Maumee, OH (US)

(*) Notice: Subject to any disclaimer, the term of this patent is extended or adjusted under 35 U.S.C. 154(b) by 227 days.

(21) Appl. No.: 17/029,146

(22) Filed: Sep. 23, 2020

(65) Prior Publication Data

US 2022/0090682 A1 Mar. 24, 2022

(51) Int. Cl.
*F16J 15/06* (2006.01)
*F16J 15/02* (2006.01)

(52) U.S. Cl.
CPC ............. *F16J 15/06* (2013.01); *F16J 15/028* (2013.01); *F16J 15/022* (2013.01)

(58) Field of Classification Search
CPC ........... F16J 15/06; F16J 15/028; F16J 15/022
See application file for complete search history.

(56) References Cited

U.S. PATENT DOCUMENTS

| | | | |
|---|---|---|---|
| 3,788,100 A * | 1/1974 | Pitner | F16D 3/41 384/477 |
| 4,530,675 A * | 7/1985 | Mazziotti | F16C 33/7809 277/362 |
| 4,834,037 A * | 5/1989 | Lafever | F16J 15/3284 277/572 |
| 5,407,387 A * | 4/1995 | Mazziotti | F16D 3/385 277/420 |
| 5,464,228 A | 11/1995 | Weber et al. | |
| 6,736,407 B2 | 5/2004 | Tremoulet, Jr. et al. | |
| 6,761,360 B2 | 7/2004 | Hammi | |
| 7,854,434 B2 | 12/2010 | Heiman et al. | |
| 8,157,269 B2 | 4/2012 | Rueger et al. | |
| 2012/0107650 A1 | 5/2012 | Kritzer et al. | |

FOREIGN PATENT DOCUMENTS

| | | | | |
|---|---|---|---|---|
| EP | 2016962 A1 * | 1/2009 | | A61C 5/04 |
| WO | WO-2019039433 A1 * | 2/2019 | | F16J 15/06 |

* cited by examiner

*Primary Examiner* — Vishal A Patel
(74) *Attorney, Agent, or Firm* — McCoy Russell LLP

(57) ABSTRACT

A seal for sealing three adjacent structures is provided. The seal has a plurality of sealing legs designed to seal against different parts of the adjacent structures. In addition, the seal may have side sealing structures that seal against a groove in which the seal may be located.

15 Claims, 2 Drawing Sheets

ELASTOMERIC SEAL FOR AN ENCLOSURE

FIELD

An elastomeric seal for an enclosure may have multiple sealing surfaces for sealing with multiple parts of the enclosure.

BACKGROUND

Seals are commonly used to seal interfaces, such as where two components of an enclosure meet. Sometimes, however, the interfaces where components meet may have complex geometries and/or there are multiple components that must be sealed at the same general interface. In these cases, seals have still been used to seal the interfaces.

In the past, interfaces with complex geometries and/or with multiple components used multiple seals located in multiple seal channels. Multiple seals and multiple seal channels, however, can be disadvantageous for several reasons.

First, adding multiple seals to an interface increases the amount of sealing material as well as the manufacturing costs. Second, the multiple seals must be located or seated in channels in an enclosure. Each channel requires space in the component, which may be at a premium and not always available. Further, creating multiple channels in the components adds manufacturing costs to the component.

In view of the disadvantages associated with the prior art seals, it would be advantageous for a seal to be able to seal complex geometries, and to do so in a cost effective and high performance manner. It would also be advantageous for a seal to take up as little space as possible on the component and to be located in a single seal channel.

SUMMARY

In one embodiment, a seal may have an upper seal area and a lower seal area. The upper seal area may have a first seal leg and a second seal leg. The lower seal area may have a third seal leg and a fourth seal leg. The seal may also have a first side seal area and a second side seal area. The first side seal area is formed from an angled wall of the first seal leg and an angled wall of the third seal leg forming a first side sealing point. The second side seal area may be formed from an angled wall of the second seal leg and an angled wall of the fourth seal leg forming a second side sealing point. The first side sealing point may be vertically offset from the second side sealing point.

In another aspect, the first seal leg comprises the angled wall of the first side seal area, a top sealing land, and a first seal leg valley wall.

In another aspect, the third seal leg comprises the angled wall of the first side seal area, a bottom sealing land and a third seal leg valley wall.

In another aspect, the top sealing land of the first seal leg and the bottom sealing land of the third seal leg are laterally aligned and parallel with one another across their entire length.

In another aspect, measured from the first side sealing point the angled wall of the first seal leg and the angled wall of the third seal leg, the angled walls have the same taper angle.

In another aspect, the second seal leg comprises the angled wall of the second side seal area, a top sealing land, and a second seal leg valley wall.

In another aspect, the fourth seal leg comprises the angled wall of the second side seal area, a bottom sealing land and a fourth seal leg valley wall.

In another aspect, the top sealing land of the second seal leg and bottom sealing land of the fourth seal leg are laterally aligned and parallel with one another across their entire length.

In another aspect, measured from the second side sealing point the angled wall of the second seal leg and the angled wall of the fourth seal leg, the angled walls have the same taper angle.

In another aspect, the taper angle of the second and fourth seal legs is not the same as the taper angle of the first and third seal legs.

In another aspect, the first and second seal legs form an upper valley between them, and the third and fourth seal legs form a lower valley between them, wherein the valleys have two different radi of curvature and the respective centers of the valleys are vertically aligned with one another.

In another aspect, the lowest most point of the upper valley is vertically below the second side wall sealing point.

In another aspect, the bottom sealing lands of the third and fourth seal legs are vertically aligned and coplanar with one another, while the top sealing lands of the first and second seal legs are not coplanar with one another.

In another aspect, the upper seal area, the lower seal area, the first seal leg and the second seal leg, are unitary, one-piece and integrally formed.

In another aspect, a seal system may have a seal having a first seal leg, a second seal leg, a third seal leg and a fourth seal leg. Further, each of the seal legs may have a sealing land. Further yet, the first seal leg and the third seal leg form a first side sealing point. Further yet, a second seal leg and a fourth seal leg form a second side sealing point. The system may also have a base plate having a groove in which at least part of the seal is located. The system may also have a mid-plate and a top plate. The first side sealing point may be adapted to seal with a first groove wall in the base plate. The second side sealing point may be adapted to seal with a second groove wall in the base plate. The third and fourth sealing lands may seal with a base of the groove in the base plate. The seal land of the first leg may be adapted to seal with a lower surface of the mid-plate. The seal land of the second leg may be adapted to seal with a lower surface of the top plate.

In another aspect, the base plate has a first upper sealing surface adapted to seal with the mid-plate and a second upper sealing surface adapted to seal with the top plate. The two upper sealing surfaces may be separated by a groove, wherein the upper sealing surfaces are not coplanar with one another.

In another aspect, the mid-plate terminates above a valley between the first leg and the second leg.

In another aspect, the top plate extends across the groove where it contacts the second upper sealing surface of the base plate.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

It is to be understood that the device may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Figure 1:
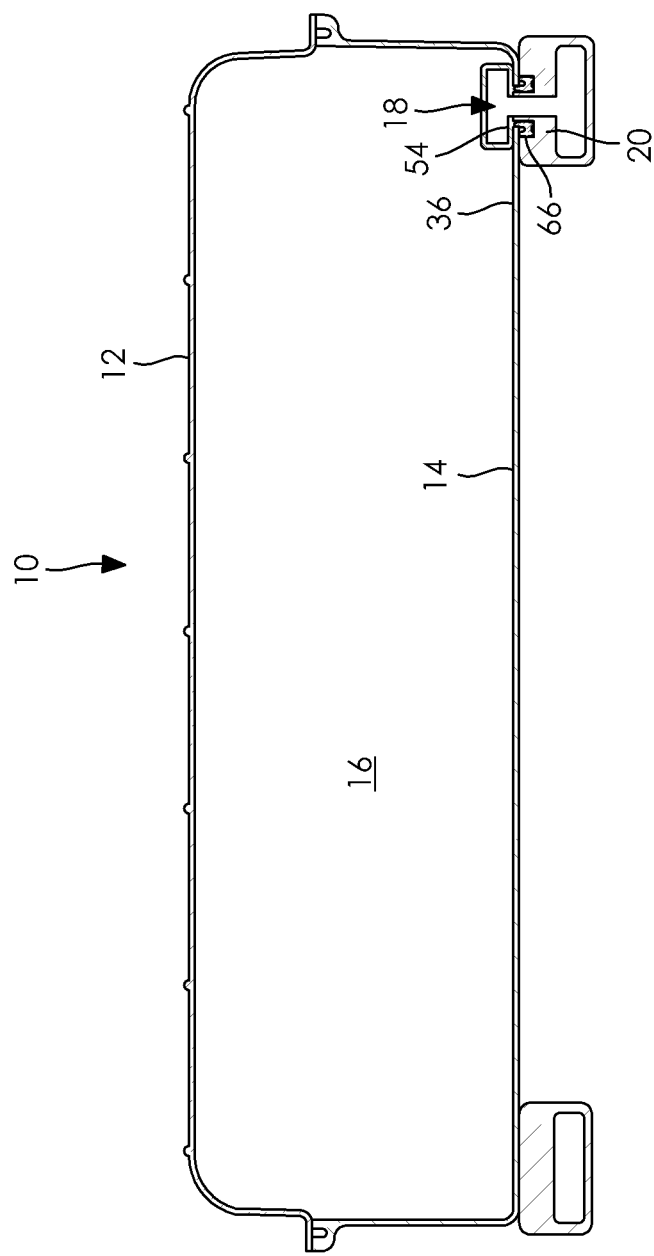
FIG. 1 is one embodiment of sectional side view of a seal in an enclosure.

Turning now to FIG. 1, one embodiment of an enclosure 10 is schematically depicted. The shape, size and structure of the enclosure 10 may be different than what is shown in FIG. 1. The enclosure 10 may have two or more portions 12, 14 that are connected together, or it may be constructed of a single portion. The enclosure 10 may have an interior volume 16, which may be continuous, or it may be compartmentalized.

The enclosure 10 may have one or more openings 18. The openings 18 may be for anything including, but not limited to, openings to access the interior volume 16. One example of such an opening 18 is for fluid, or for a structure containing a fluid, to enter into the enclosure 10 and/or interior volume 16.

In one embodiment, a seal 66, described below, may be located at least partially about the opening 18. It may be preferred that the seal 66 is in located entirely about the opening 18 in a continuous and uninterrupted fashion.

While FIG. 1 depicts the seal 66 located about an opening, such as a fluid opening, the seal 66 may also be located at the intersection of any enclosure portions. It is possible to use multiple seals 66 in a single enclosure to seal various intersections.

Figure 2:
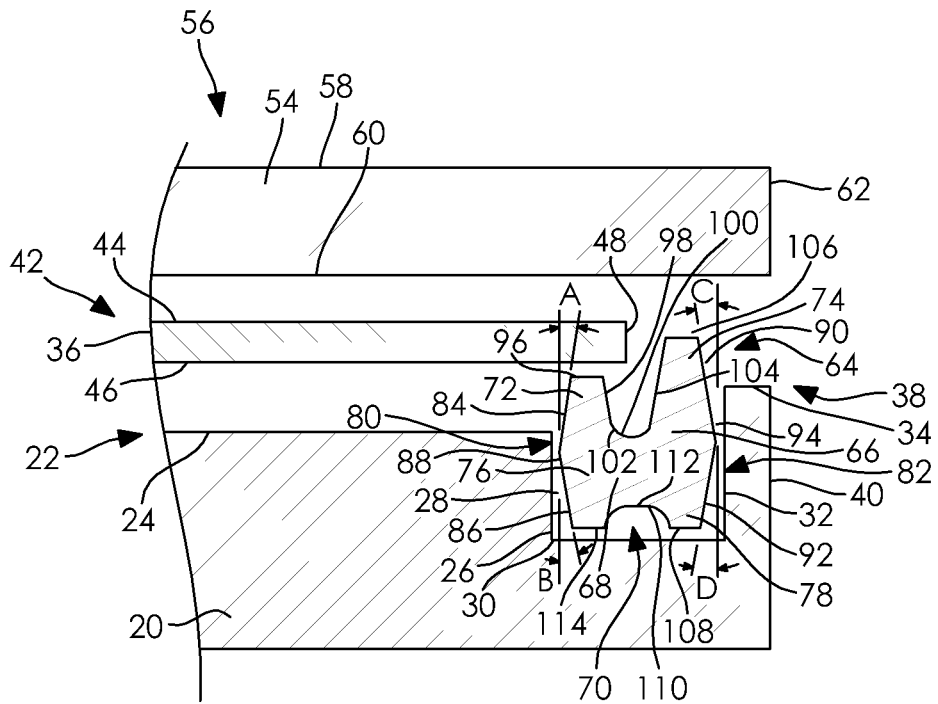
FIG. 2 is one embodiment of a sectional side view of the seal along lines 2-2 of FIG. 1 in a first condition.
Figure 3:
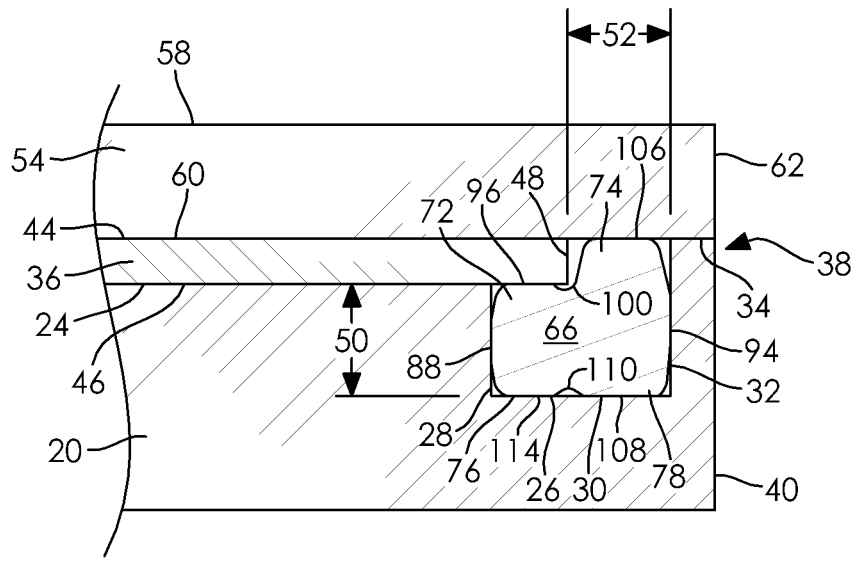
FIG. 3 is one embodiment of a sectional side view of the seal along lines 2-2 of FIG. 2 in a second condition.

Turning now to FIGS. 2 and 3, one embodiment of a base plate 20 for the enclosure is schematically depicted. The base plate 20 may have a sealing portion 22. The sealing portion 22 may comprise a first upper sealing surface 24. The first upper sealing surface 24 may be substantially planar.

The first upper sealing surface 24 may extend to a groove 26 in the base plate 20. The groove 26 may be part of the sealing portion 22 of the base plate 20. In the depicted embodiment, the groove 26 does not extend entirely through the base plate 20. Instead, the groove 26 may be maintained within the thickness of the base plate 20.

The groove 26 may have a first groove wall 28 that extends into the base plate 20 in a perpendicular fashion with respect to the first upper sealing surface 24. The first groove wall 28 may be continuous and uninterrupted along its length. The transition between the first groove wall 28 and the first upper sealing surface may be such as a 90 degree angle, but other angles may be permissible.

The first groove wall 28 transitions to a base surface 30 of the groove 26. The transition may be such as a 90 degree angle, but other angles may be permissible.

The base surface 30 of the groove 26 extends in a planar fashion, parallel with the first upper sealing surface 24. The base surface 30 may be continuous and uninterrupted along its length.

A second groove wall 32 transitions from the base surface 30. The transition may be such as a 90 degree angle, but other angles may be permissible. The second groove wall 32 extends parallel the first groove wall 28 and perpendicular to the base surface 30. The second groove wall may be continuous and uninterrupted along its length. The second groove wall 32 extends vertically above the first groove wall 28 and the first upper sealing surface 24.

The second groove wall 32 transitions to a second upper sealing surface 34 of the base plate 20. The transition may be such as a 90 degree angle, but other angles may be permissible. The second upper sealing surface 34 may be part of the sealing portion 22 of the base plate 20. The second upper sealing surface 34 may be continuous and uninterrupted along its length. The second upper sealing surface 34 may also be parallel, but not planar with, the first upper sealing surface 24 or the base surface 30. Instead, the second upper sealing surface 34 is located a predetermined distance above the first upper sealing surface 24. The predetermined distance may be such as the thickness of a mid-plate 36.

The lateral extension, or length, of the second upper sealing surface 34 may be only a portion of the lateral extension, or length, of the first upper sealing surface 24. In one embodiment, the second upper sealing surface 34 lateral extension is less than 50 percent of the first upper sealing surface 24 lateral extension. In another embodiment, the second upper sealing surface 34 lateral extension is less than 25 percent of the first upper sealing surface 24 lateral extension.

The second upper sealing surface 34 may transition to an end portion 38 of the base plate 20. The transition between the second upper sealing surface 34 and the end portion 38 may be such as a 90 degree angle, but other angles may be permissible. The end portion 38 may further be defined by an end wall 40, which may extend substantially perpendicular to the second upper sealing surface 36. The end wall 40 may be parallel the first and second groove walls 28, 32. The sealing portion 22 of the base plate 20, as well as the base plate 20, may terminate at the end portion 38.

FIGS. 2 and 3 also depict one embodiment of the mid-plate 36 for the enclosure. The mid-plate 36 may have a sealing portion 42. At or about the sealing portion 42, the mid-plate 36 may have an upper surface 44, a lower surface 46 and end surface 48. The upper and lower surfaces 44, 46 may be parallel one another, as well as planar.

The upper and lower surfaces 44, 46 may define a constant thickness between them. In one embodiment, the mid-plate 36 has a thickness that is only a fraction of the thickness of the base plate 20. The thickness fraction may be such as 25 percent of the base plate 20 thickness. In the depicted embodiment, the fraction thickness may be such as 50 percent or more of the base plate 20 thickness.

The lower surface 46 of the mid-plate 36 has a complementary shape with at least a portion of the first upper sealing surface 24 of the base plate 20. Preferably, the lower surface 46 of the mid-plate 36 and the first upper sealing surface 24 of the base plate 20 are adapted to be located in direct contact overlapping with one another in the assembled condition, as shown in FIGS. 2 and 3.

The mid-plate 36 may also be adapted so that the end surface 48 terminates over the groove 26 of the base plate 20 in the assembled condition. In one embodiment, the end surface 48 is cantilevered from the first upper sealing surface 24 over the first groove wall 28 so that a gap 50 exists between the lower surface 46 of the mid-plate 36 and the base surface 30 of the groove 26.

The mid-plate 36 may extend approximately 20-75 percent of the width of the groove 26. In one embodiment, the mid-plate 36 may extend approximately 50% over the groove 26. Preferably, the mid-plate 36 leaves a gap 52 between its end surface 48 and the second groove wall 32. The end surface 48 may be parallel the first and second groove walls 28, 32. In the assembled condition as shown in FIG. 3, it may be preferred for the upper surface 44 of the mid-plate 36 to be parallel and co-planar with the second upper sealing surface 34 of the base plate 20.

FIGS. 2 and 3 also depict one embodiment of a top plate 54 for the enclosure. The top plate 54 may have a sealing portion 56. At or about the sealing portion 56, the top plate 54 may have an upper surface 58, a lower surface 60 and end surface 62. The upper and lower surfaces 58, 60 may be parallel one another, as well as planar.

The upper and lower surfaces 58, 60 may define a constant thickness between them. In one embodiment, the top plate 54 has a thickness that may be a multiple of the thickness of the mid-plate 36. The thickness multiple may be such as 125 percent of the mid-plate 36 thickness. In the depicted embodiment, the multiple may be such as 150 percent or more of the mid-plate 36 thickness.

The lower surface 60 of the top plate 54 has a complementary shape with at least a portion of the upper surface 44 of the mid-plate 36. Preferably, the lower surface 60 of the top plate 54 and the upper surface 44 of the mid-plate 36 are adapted to be located in direct overlapping contact with one another in the assembled condition, as shown in FIG. 3.

The top plate 54 may also be adapted so that the end surface 62 terminates at or adjacent the end wall 40 of the base plate 20. In this embodiment, the end surface 62 may be parallel and co-planar with the end wall 40. In this condition, the lower surface 60 of the top plate 54, adjacent the end surface 62 of the top plate 54, rests directly on the second upper sealing surface 34 of the base plate 20.

From the above, it can be appreciated that the top plate 54, or at least the lower surface 60 of the top plate 54, extends entirely over the groove 26 in the base plate 20. The top plate 54, or at least the lower surface 60 of the top plate 54, extends over the base plate 20 groove 26 in a continuous and uninterrupted fashion.

The base plate 20, the mid-plate 36 and the top plate 54 may function together to create an enclosed cavity 64, and the groove 26 forms part of the cavity 64.

The Figures also depict one embodiment of a seal 66. The seal 66 may be entirely located in the enclosed cavity 64 defined by the base plate 20, the mid-plate 36 and the top plate 54. The seal 66 may be unitary, one-piece and integrally formed. In one embodiment, no other structures are fully or partially within the seal 66. An example of structure that is not present in one embodiment of the seal 66 is a retainer. Retainers may be comprised of one or more metal pieces that are used to reinforce or stiffen the seal 66.

The seal 66 may be constructed of a resilient but elastic material. The material may also be heat and water resistant. In one embodiment, the seal 66 may be constructed of a polymeric material. The seal may be constructed of EPDM rubber (ethylene, propylene, and a diene co-monomer), or silicone rubber.

The seal 66 may have an upper seal area 68 and a lower seal area 70. The upper seal area 68 may have a first seal leg 72 and a second seal leg 74. The lower seal area 70 may have a third seal leg 76 and a fourth seal leg 78.

The seal 66 may also have a first side seal area 80, which may be part of the upper and lower seal areas 68, 70. The seal 66 may also have a second side seal area 82, which may be part of the upper and lower seal areas 68, 70.

The first side seal 80 area may be formed from an angled wall 84 of the first seal leg 72 and an angled wall 86 of the third seal leg 76. The angled walls 84, 86 may form a first side sealing point 88. The first side sealing point 88 functions as a transition between the first seal leg 72 and the third seal leg 76. The first side seal point 88 may, on this side of the seal 66, define the lateral-most extent of the seal 66. The angled walls 84, 86 of the first seal leg 72 and the third seal leg 76 may share the same length.

The angled wall 84 of the first seal leg 72 may be angled from vertical by Angle A. Angle A may be such as approximately 5-25 degrees.

The angled wall 86 of the third seal leg 76 may be angled from vertical by Angle B. Angle B may be such as approximately 5-25 degrees. It is preferred that Angles A and B be the same, but they may be different.

The second side seal area 82 may be formed from an angled wall 90 of the second seal leg 74 and an angled wall 92 of the fourth seal leg 92. The angled walls 90, 92 may form a second side sealing point 94. The second side sealing point 94 functions as a transition between the second seal leg 74 and the fourth seal leg 78. The second side seal point 94 may, on this side of the seal 66, define the lateral-most extent of the seal 66. The angled walls 90, 92 of the second seal leg 74 and the fourth seal leg 78 may share the same length.

The angled walls 90, 92 of the second seal leg 74 and the fourth seal leg 78 may be longer than the angled walls 84, 86 of the first seal leg 72 and the third seal leg 76. Thus, the angled walls 90, 92 of the second seal leg 74 and the fourth seal leg 78 have a longer vertical extension compared with the angled walls 84, 86 of the first and third seal legs 72, 76. In the uninstalled, or uncompressed, embodiment, the angled walls 84, 86, 90, 92 of the seal 66 may be linear.

Further, the second side sealing point 94 may be located vertically above, or offset from, the first side sealing point 88 so that the two are not horizontally aligned with one another.

The angled wall 90 of the second seal leg 74 may be angled from vertical by Angle C. Angle C may be such as approximately 5-25 degrees.

The angled wall 92 of the fourth seal leg 78 may be angled from vertical by angle D. Angle D may be such as approximately 5-25 degrees. It is preferred that Angles C and D be the same, but they may be different. In one embodiment, Angles A and B may be less than, or the same, as Angles C and D. It may be preferred that Angles A and B are different than Angles C and D, which may help to stabilize the seal 66 within the groove 26. Having different angles may also help the seal 66 to separate from the mold when it is formed.

The first seal leg 72 may be comprised of the angled wall 84 of the first side seal area 80, a top sealing land 96 and a first seal leg valley wall 98.

The angled wall 84 of the first side seal area 80 may transition to the top sealing land 86 at an angle. The top sealing land 96 may have a substantially planar surface. The planar surface may comprise all, or substantially all, of the top sealing land 96. The top sealing land 96 may transition to the first seal leg valley wall 98 through an angle. The first seal leg valley wall 98 may be an angled linear wall (in the uninstalled, or uncompressed, embodiment) and/or part of a radius defining an upper seal valley 100. The first seal leg valley wall 98 may be shorter than, and non-parallel with, the angled wall 84 of the first seal leg 72. The first seal leg valley wall 98 may be nonparallel with the angled wall 84 of the first seal leg 72. In one embodiment, the first seal leg valley wall 98 and the angled wall 84 of the first seal leg 72 may taper down as they extend upwardly toward the top sealing land 96.

The upper seal valley 100 may be defined by a concave surface with a fixed radius. The upper seal valley 100 may have a lowest point 102 that is located vertically above the first side sealing point 88 but below the second side sealing point 94.

The second seal leg 74 may be comprised of a second seal leg valley wall 104, a top sealing land 106 and the angled wall 86 of the third sealing leg 76. The second seal leg valley wall 104 may be an angled linear wall (in the uninstalled, or uncompressed, embodiment) and/or part of the radius defining the upper seal valley 100. The second seal leg valley wall 104 may be longer than the first seal leg valley wall 98. Further, the first and second seal leg valley walls 98, 104 may be angled away from one another.

The second seal leg valley wall 104 may transition to the top sealing land 106 at an angle. The top sealing land 106 may have a substantially planar surface. The planar surface may comprise all, or substantially all, of the top sealing land 106. The top sealing land 106 may transition to the angled wall 86 of the third sealing leg 76.

The second seal leg valley wall 104 may be shorter, and non-parallel with, the angled wall 90 of the second seal leg 74. In one embodiment, the second leg valley wall 104 and the angled wall 90 of the second seal leg 74 may taper down as they extend upwardly toward the top sealing land 106.

The angled wall 90 of the second seal leg 74 transitions to the angled wall 92 of the fourth seal leg 78 at the second side sealing point 94. The angled wall 90 of the fourth seal leg 78 transitions to a lower sealing land 108 of the fourth seal leg 78. The lower sealing land 108 may be substantially planar. The planar surface may comprise all, or substantially all, of the lower sealing land 108. The lower sealing land 108 transitions to a lower seal valley 110. Thus, the fourth seal leg 78 may be comprised of the angled wall 92, the lower sealing land 108 and at least a portion of the lower seal valley 110.

The lower seal valley 110 may be a concave surface in the seal 66. The lower seal valley 110 may be defined by a constant radius. The radius of the lower seal valley 110 may be larger than the radius of the upper seal valley 100. A lowest point 112 of the lower seal valley 110 may be laterally, or horizontally, aligned with the lowest point 102 of the upper seal valley 100. Further, the first side sealing point 88 and the second side sealing point 94 may be located vertically above the lowest point 112 of the lower seal valley 110. The upper seal valley 100 and the lower seal valley 110 extends into the seal 66 toward one another.

The lower seal valley 110 transitions to the third seal leg 76. The third seal leg 76 may be comprised of at least a portion of the lower seal valley 110, a lower sealing land 114 of the third leg 76 and the angled wall 86 of the third leg 76. The lower sealing land 114 may be substantially planar. The planar surface may comprise all, or substantially all, of the lower sealing land 114.

The lower sealing lands 114, 108 of the third and fourth seal legs 76, 78 may be parallel and coplanar with one another. The top sealing lands 96, 106 of the first and second legs 72, 74 may be parallel, but they are not coplanar with one another. Further, the sealing lands 96, 106, of the first seal leg 72 and the third seal leg 76 may be laterally, or horizontally, aligned with one another so that they start and stop at the same, or nearly the same, horizontal points. Similarly, the sealing lands 106, 108 of the second seal leg and the fourth seal leg 74, 78 may be laterally, or horizontally, aligned with one another so that they start and stop at the same, or nearly the same, horizontal points.

In another embodiment (not shown), a linear fourth seal leg valley wall may be used to transition from the lower sealing land 108 of the fourth seal leg 78 to the lower seal valley 110. Additionally, or alternatively, a linear third seal leg valley wall may be used to transition from the lower sealing land 114 of the third leg 76 to the lower seal valley 110.

In one embodiment, such as when the seal 66 is located within the cavity 64, shown in FIG. 3, the first side sealing point 88 is adapted to seal with the first groove wall 28 in the base plate 20. The second side sealing point 94 is also adapted to seal with the second groove wall 32 in the base plate 20. Additionally, the lower sealing lands 108, 114 seal with the base surface 30 of the groove 26 in the base plate 20. Further, the seal land 96, of the first leg 72 is adapted to seal with the lower surface 46 of the mid-plate 36. And, the seal land 106 of the second leg 74 is adapted to seal with the lower surface 60 of the top plate 54. In the installed condition, the seal 66 is compressed which causes the legs 72, 74, 76, 78 to shorten, as well as widen. Preferably, however, each of the legs 72, 74, 76, 78 retains its general tapered shape and individual nature.

The first upper sealing surface 24 of the base plate 20 is adapted to seal with the lower surface 46 of the mid-plate 42. And, the second upper sealing surface 24 of the base plate 20 is adapted to seal with the top plate 54. In this embodiment, the two upper sealing surfaces 24, 34 are separated by the groove 26.

In accordance with the provisions of the patent statutes, the present device has been described in what is considered to represent its preferred embodiments. However, it should be noted that the invention can be practiced otherwise than as specifically illustrated and described without departing from its spirit or scope.

What is claimed is:

1. A seal, comprising:
   an upper seal area and a lower seal area,
   wherein said upper seal area has a first seal leg and a second seal leg,
   wherein said lower seal area has a third seal leg and a fourth seal leg, a first side seal area and a second side seal area,
   wherein said first side seal area is formed from an angled wall of said first seal leg and an angled wall of said third seal leg forming a first side sealing point,
   wherein said second side seal area is formed from an angled wall of said second seal leg and an angled wall of said fourth seal leg forming a second side sealing point,
   wherein said first side sealing point is vertically offset from said second side sealing point,
   wherein said angled wall of said first seal leg and said angled wall of said third seal leg have a same taper angle relative to said first side sealing point,
   wherein said angled wall of said second seal leg and said angled wall of said fourth seal leg have a same taper angle relative to said second side sealing point,
   wherein the taper angle of said second and fourth seal legs is not the same as the taper angle of said first and third seal legs,
   wherein an upper valley is formed between said first and second seal legs, and a lower valley is formed said third and fourth seal legs.

2. The seal of claim 1, wherein said first seal leg comprises said angled wall of said first side seal area, a top sealing land, and a first seal leg valley wall.

3. The seal of claim 2, wherein said third seal leg comprises said angled wall of said first side seal area, a bottom sealing land and a third seal leg valley wall.

4. The seal of claim 3, wherein said top sealing land of said first seal leg and said bottom sealing land of said third seal leg are laterally aligned and parallel with one another across their entire length.

5. The seal of claim 2, wherein said second seal leg comprises said angled wall of said second side seal area, a top sealing land, and a second seal leg valley wall.

6. The seal of claim 5, wherein said fourth seal leg comprises said angled wall of said second side seal area, a bottom sealing land and a fourth seal leg valley wall.

7. The seal of claim 6, wherein said top sealing land of said second seal leg and bottom sealing land of said fourth seal leg are laterally aligned and parallel with one another across their entire length.

8. The seal of claim 1, wherein lowestmost point of the upper valley is vertically below the second side sealing point.

9. The seal of claim 8, wherein said bottom sealing lands of said third and fourth seal legs are vertically aligned and coplanar with one another, while said top sealing lands of said first and second seal legs are not coplanar with one another.

10. The seal of claim 1, wherein said upper seal area, said lower seal area, said first seal leg and said second seal leg, are unitary, one-piece and integrally formed.

11. A seal system, comprising:
a seal having a first seal leg, a second seal leg, a third seal leg and a fourth seal leg,
wherein each of said seal legs has a sealing land,
wherein said first seal leg and third seal leg form a first side sealing point,
wherein the second seal leg and the fourth seal leg form a second side sealing point,
a base plate having a groove in which at least part of said seal is located,
a mid-plate, and
a top plate,
wherein said first side sealing point us adapted to seal with a first groove wall in said base plate, said second side sealing point is adapted to seal with a second groove wall in said base plate, said third and fourth sealing lands seal with a base of said groove in said base plate,
wherein said seal land of said first leg is adapted to seal with a lower surface of said mid-plate,
wherein said seal land of said second leg is adapted to seal with a lower surface of said top plate
wherein said angled wall of said first seal leg and said angled wall of said third seal leg have a same taper angle relative to said first side sealing point,
wherein said angled wall of said second seal leg and said angled wall of said fourth seal leg have a same taper angle relative to said second side sealing point,
wherein the taper angle of said second and fourth seal legs is not the same as the taper angle of said first and third seal legs,
wherein an upper valley is formed between said first and second seal legs, and a lower valley is formed said third and fourth seal legs.

12. The seal system of claim 11, wherein said base plate has a first upper sealing surface adapted to seal with said mid-plate and a second upper sealing surface adapted to seal with top plate, wherein said two upper sealing surfaces are separated by said groove, wherein said upper sealing surfaces are not coplanar with one another.

13. The seal system of claim 12, wherein said mid-plate terminates above a valley between said first leg and said second leg.

14. The seal system of claim 12, wherein said top plate extends across said groove where it contacts said second upper sealing surface of said base plate.

15. The seal system of claim 11, wherein said seal is entirely contained within the base plate, the mid-plate and the top plate.

* * * * *